June 14, 1955  O. C. BETRY  2,710,743
DRINK MIXING MACHINE
Filed March 31, 1952
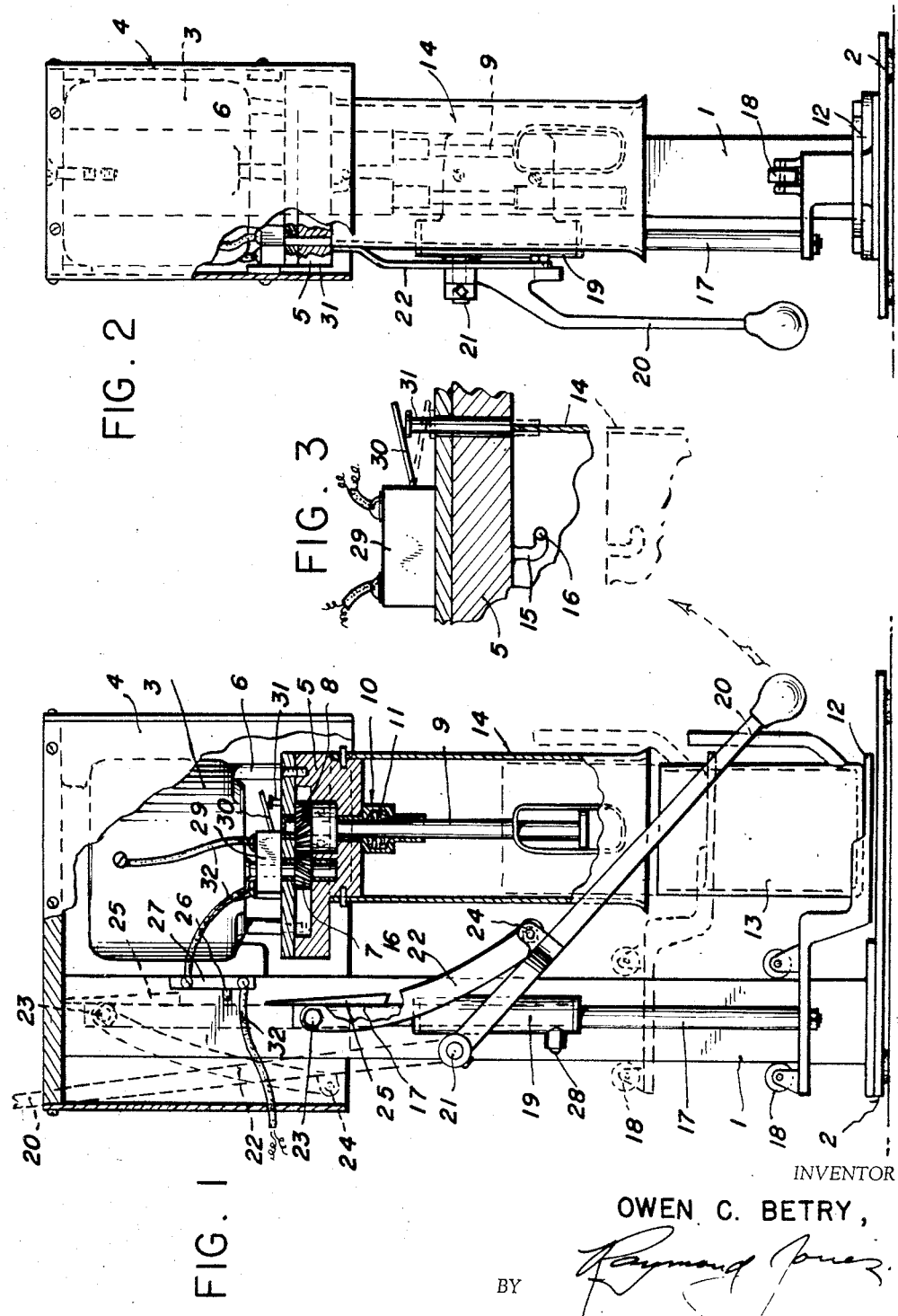
INVENTOR
OWEN C. BETRY,
BY
ATTORNEY

United States Patent Office 2,710,743
Patented June 14, 1955

2,710,743

DRINK MIXING MACHINE

Owen C. Betry, Glendale, Calif.

Application March 31, 1952, Serial No. 279,590

7 Claims. (Cl. 259—108)

My invention relates to a drink mixing machine of the motor driven type but more particularly to a machine that is adapted for mixing the heavier types of drinks such as malt mixes, ice cream drinks, shakes and the like.

In drink mixers as now found in general use, the fountain attendant, after depositing the drink ingredients within the beater cup, finds it necessary to position the cup below the beater element and then raise the cup carefully to ensure that this element is properly immersed. Some means is usually provided to retain the cup in an elevated position during the mixing operation and, when the top edge of this cup is accurately positioned, a switch will be contacted that starts a motor which rotates the beater. Such mode of operation requires that the attendant give particular care to properly positioning the cup.

According to my invention, the attendant need merely place the cup upon a platform formed to receive the cup and to accurately position the same. Thereafter, all that the attendant need do is to elevate a main control lever which functions to elevate the cup and the platform to an extreme upper position at which the beater becomes properly immersed. The movement of the cup elevating mechanism controls the starting of the beater motor and it is preferred to start this motor very soon after the beater touches the mix and before any immersion of the beater occurs, and for a reason to be explained. The lever and related mechanism are arranged also to cause this lever to be retained in its elevated position until the operator acts to manually lower this lever.

The improved drink mixer disclosed is designed particularly to mix drinks of the relatively heavy or thick type, such as will cause a heavy load on the motor. In mixers now in general use, the motor is not started until the beater is fully immersed and, thereafter, the motor will draw a heavy current, hence when the switch is opened at the end of the mixing operation, with the beater fully immersed, a large arc is drawn across the switch contacts which results in a rapid wear thereof and a more expensive replacement and repair cost. According to the present invention, the beater motor is started soon after the tip of the beater is immersed and this switch is opened after the mixing is complete, but only after the beater has been withdrawn from the mix except for a short distance adjacent to its tip end at which position the motor is subjected to a relatively small load. This novel result is obtained by causing the cup raising mechanism, through a cam operated thereby, to operate a switch only after the main control lever has lowered the mixing cup to a position wherein the motor load is relatively small.

The main object of this invention is to provide a mixing machine wherein all mixing operations are made operably responsive to a single manual act of raising and lowering a lever.

Another object is to provide a novel and practical form of spray shield or guard positioned to surround the mixing cup during the mixing of its contents to prevent any lateral splashing of cup contents either when the cup is elevated or when lowered at which time the rotation of the beater tends to throw liquid from the beater due to centrifugal action.

Another object is to provide a cup or spray shield which functions, when in position on the machine, to contact and operate a switch that maintains the motor circuit closed during beater operation. When the shield is removed, this switch is permitted to open the motor circuit in a manner to ensure that the motor cannot be started, at which time, the attendant may clean the beater or work on the machine without any danger of starting the motor.

Another object is to provide a motor control that is responsive to relative movement of the cup raising mechanism wherein the circuit of the motor is broken by a switch only at the instant when the motor load has been materially reduced by complete withdrawal of the beater from the mix.

A further object is to provide a mixing machine that is practical in operation, relatively rugged in construction and which is economical to manufacture and maintain.

Other objects will become apparent from the detailed description which follows:

In the drawings:

Fig. 1 is a view in side elevation partly in section showing the movable parts in full lines in the lowered position and, by dotted lines, in their elevated position.

Fig. 2 is a view, in front elevation, of the mixing machine, and

Fig. 3 is an enlarged view of the safety switch and an operating pin associated therewith.

Referring to the drawings in detail, there is provided a main tubular standard 1 which is secured at its lower end to a base 2. A motor 3 is supported upon the upper end of this standard and a hood or casing 4, also secured to this standard, serves as a cover or casing to surround this motor and other vital elements to protect same from injury.

A gear box 5 is suspended from the motor by means of posts or bolts 6 and a gear 7 on the motor shaft meshes with a pair of gears 8 which cause a pair of beaters 9 to rotates in opposite directions. A housing 10 serves to enclose a spring loaded oil seal 11 that surrounds the upper end of each beater shaft.

A mixing cup supporting platform 12 is formed to receive the mixer cup 13 to properly position this cup with reference to the beaters and to ensure that the cup is properly aligned axially to be received within a shield 14. This shield is detachably secured to the gear box 5 by means of several bayonet slots 15 that receive locking pins 16 that project from the gear box.

A lift rod 17 secured to the platform 12 may be elevated to raise this platform and guide rollers 18 on the platform function to guide the lift rod and to reduce friction. The rod 17 passes through a guide sleeve or bearing 19 that is mounted on the standard 1 by means of bolts or screws. A main operating lever 20 is bolted at its inner end at 21 to the standard 1 so as to be pivoted thereto. A lift rod operating link 22 is pivotally connected at 23 to the upper end of the lift rod and, at its lower end, at 24 to the lever 20. A cam 25 is mounted adjacent to the upper end of this link in a position to strike the operating plunger 26 of a micro switch 27. The switch 27 is mounted on the standard 1 in a position to be struck by the cam 25, formed or mounted on rod 17.

The cup 13 and its operating mechanism may be held in an intermediate position to permit the beaters to operate only near the top level of the drink mix by means of a ball detent of the spring pressed type 28 positioned on the sleeve 19 and which can engage a recess on the rod 17. When the lever 20 is raised to its extreme upper position and then further to its position as shown in dotted lines in Fig. 1, this lever and its connected link 22 will have passed over dead center and the lever will remain in that position.

During upward travel of the rod 17, the cam 25 thereon will strike the plunger 26 and start the motor and, when the lever 20 is lowered, the cam will slide from this plunger to let the switch open to stop the motor. I prefer to position the switch 27 so that the motor will be started and stopped when the lift rod 17 is about one inch above its lowered position for a reason to be explained later on.

Fig. 3 shows in greater detail the operation of a safety switch 29 that is mounted on the gear box. A short lever 30 functions to operate this switch and is positioned to be engaged by a pin 31 that is slidably mounted within a passage formed in the wall of the gear box. The lower end of this pin is positioned at a point that will permit it to be engaged by the upper rim edge of the shield 14. When the shield is attached with the pins 16 within the respective slots 15 and rotated to be properly engaged, the pin 31 is forced upwardly to operate the switch 29 to complete the motor circuit. Therefore, when the cam 25 strikes the plunger 26 on its upstroke, the motor will operate because the switches 27 and 29 have their contacts in series with the motor armature circuit.

When the shield 14 is removed to permit say cleaning of the beaters, the pin 31 is permitted to drop and the contacts within this switch will be separated so that the motor circuit is opened at this point, hence a safety feature is had because the motor cannot be started while the switch 29 is in an open condition. The conductors 32 are shown as being in series with both switches and the motor circuit.

I prefer to start and stop the motor at the time when the motor load is relatively small so that no appreciable sparking takes place at switch 27 hence to reduce any burning of the contacts therein. For that purpose, the cam 25 and switch 27 are positioned relative to each other so that that switch will be opened when the rod 17 has been lowered to within about one inch of its lowest position at which time the beaters are immersed in the mix but a short distance and when the motor is drawing but a small current.

The operation of the machine will be readily understood from the foregoing description. After the cup has been positioned upon the platform 12, the lever 20 is raised until it has passed over dead center. On the up stroke of the cam 25, it will strike the plunger 26 to start the motor and, at the end of the beater operation, the lever 20 is lowered. When the rod 17 is still about one inch above its lowermost position, the cam 25 will release the plunger 26 to stop the motor, just as the beaters leave the mix.

At any time when the shield 14 is removed, the switch 29 automatically opens to prevent the motor from starting say if inadvertently the lever 20 is raised appreciably.

Since the machine disclosed has been designed to efficiently mix drinks of the heavier type, it is considered to be an important feature that the mixing operation be completed when the beaters are still immersed a short distance within the mix and the motor is stopped at that instant, as described, to reduce the arcing at the switch contacts. This results, also, in permitting the beaters to stop their rotation before they are withdrawn from the mix hence preventing excessive lateral spraying of droplets of the mix from the beaters.

The mixing machine disclosed requires but little attention on the part of the attendant and the human element does not enter into the automatic operation of certain elements and this results in a more efficient mixing operation and a functioning of parts that will eliminate appreciable repair expense in upkeep.

Claims to the invention are made as follows:

1. A drink mixing machine comprising a vertical standard, a motor secured to the upper end of the standard, a beater element connected to said motor for operation thereby, a platform for supporting a mixer cup, a lift rod projecting upwardly from the platform, a lever pivotally connected to said standard and being movable from a lowered position to an elevated position substantially parallel to said rod, a link connected to one end of said lever and at the opposite end thereof adjacent to the upper end of said rod whereby an upward movement of said lever will function to elevate said lift rod in a manner to raise the platform and a cup thereon until the beater is immersed within the contents of the cup said link and lever being operable as toggle elements whereby, when the lever has moved the link upwardly and positioned the lower end thereof to the rear of the standard, the lever will be retained in its elevated position.

2. In a machine as set forth in claim 1, a switch for controlling the operation of the motor, a cam operably connected to the platform operating mechanism and being positioned to engage said switch during the operating motion of said mechanism.

3. In a machine as set forth in claim 1, wherein the rod connected to the link is provided with a cam, a switch fixed in a position to be engaged by said cam during operation of the lever to elevate the mixing cup whereby to start operation of the motor.

4. In a drink mixing machine, a beater element, a motor for operating said element, a guard shield positioned to surround said beater element, a cup supporting platform, and means for raising said platform to position the cup on the platform within the shield a switch having contacts in circuit with the motor circuit, a plunger pin slidably supported in a position to engage said switch, said pin being positioned to be engaged by said shield when in a position surrounding the beater element, said pin being movable to a position to permit said switch to open the motor circuit when the shield is removed from the machine.

5. In a mixing machine, a vertical standard, a lift rod slidably supported on said standard, a mixing cup platform secured to the lower end of said rod, a lever pivoted at one end to said standard, a link secured at one end to said lever by a pivot intermediate the ends thereof and at its other end to the upper end of the lift rod, a beater element, a motor for operating said element, said platform being movable upwardly upon movement of said lever to position a cup on said platform in a raised position with the beater element positioned within the cup said link and that portion of the lever between said pivot and its pivoted rear end serving to form a toggle, said pivot normally being positioned in front of the lift rod whereby, when the lever has moved the pivot to the rear of the lift rod, said toggle will act to retain the rod in its extreme upper position.

6. In a machine as set forth in claim 5, a guard shield positioned to surround said beater element, said shield functioning to prevent lateral spray from the beater and to prevent unintentional contact therewith on the part of the operator a switch in the circuit to said motor, said switch being movable to open and closed positions and being positioned to engage the shield, said switch being moved to its open position when the shield is removed to expose the beater.

7. In a machine as set forth in claim 1, a detent fixidly supported in relation to the standard and in a position to be engaged by the lift rod during its upward travel, said rod and detent being provided with cooperating interengagnig means operative to retain the rod when the mixing cup is in its substantially half raised position.

References Cited in the file of this patent

UNITED STATES PATENTS

| 1,700,729 | Gilchrist | Jan. 29, 1929 |
| 1,711,396 | Ruetz | Apr. 30, 1929 |
| 2,078,190 | Bemis | Apr. 20, 1937 |
| 2,463,697 | Kipper | Mar. 8, 1949 |